(12) United States Patent
Zietlow et al.

(10) Patent No.: US 10,886,737 B2
(45) Date of Patent: Jan. 5, 2021

(54) ENERGIZATION CONTROL FOR ESTABLISHING MICROGRIDS

(71) Applicant: S&C Electric Company, Chicago, IL (US)

(72) Inventors: Daniel H. Zietlow, Cedaburg, WI (US); William Yadusky, Franklin, WI (US); Benjamin M. Stocks, Milwaukee, WI (US)

(73) Assignee: S&C Electric Company, Chicago, IL (US)

( * ) Notice: Subject to any disclaimer, the term of this patent is extended or adjusted under 35 U.S.C. 154(b) by 549 days.

(21) Appl. No.: 15/412,417

(22) Filed: Jan. 23, 2017

(65) Prior Publication Data

US 2017/0214250 A1 Jul. 27, 2017

Related U.S. Application Data

(60) Provisional application No. 62/286,667, filed on Jan. 25, 2016.

(51) Int. Cl.
*H02J 3/46* (2006.01)
*H02J 3/06* (2006.01)
*H02J 3/18* (2006.01)
*H02J 3/38* (2006.01)
*H02J 5/00* (2016.01)

(52) U.S. Cl.
CPC ............... *H02J 3/06* (2013.01); *H02J 3/18* (2013.01); *H02J 3/38* (2013.01); *H02J 5/00* (2013.01); *H02J 2310/14* (2020.01); *Y02B 70/30* (2013.01); *Y02E 40/30* (2013.01); *Y04S 20/242* (2013.01)

(58) Field of Classification Search
CPC .... G05B 15/02; G05F 1/66; H02J 3/14; H02J 3/28; H02J 3/32; H02J 4/00; H02J 2003/143; Y02B 70/3225; Y02B 70/3266; Y04S 20/222; Y04S 20/242; Y10T 307/313; Y10T 307/391
See application file for complete search history.

(56) References Cited

U.S. PATENT DOCUMENTS

2005/0012395 A1* 1/2005 Eckroad .................... H02J 3/16
307/44
2005/0194944 A1* 9/2005 Folts ..................... H02J 3/1828
323/209
(Continued)

OTHER PUBLICATIONS

United States International Searching Authority, International Search Report and Written Opinion for International Application No. PCT/US17/14671 dated Apr. 7, 2017.
(Continued)

*Primary Examiner* — Rexford N Barnie
*Assistant Examiner* — Elim Ortiz

(57) ABSTRACT

Methods for energizing microgrids and microgrid energy distribution systems are provided. A method for energizing a microgrid includes energizing a storage management system (SMS) that is configured to control power distribution in the microgrid. The method further includes connecting a plurality of reactive components to the SMS based on a configuration control programmed into the SMS. The method yet further includes ramping up an output voltage of the SMS based on limiting inrush currents of the plurality of reactive components in the microgrid.

19 Claims, 2 Drawing Sheets

(56) References Cited

U.S. PATENT DOCUMENTS

| | | | |
|---|---|---|---|
| 2008/0197630 A1* | 8/2008 | Wakitani | H02J 9/062 |
| | | | 290/2 |
| 2010/0274407 A1 | 10/2010 | Creed | |
| 2011/0273022 A1* | 11/2011 | Dennis | H02J 1/10 |
| | | | 307/72 |
| 2012/0261999 A1 | 10/2012 | Parkhideh et al. | |
| 2013/0041516 A1 | 2/2013 | Rockenfeller et al. | |
| 2014/0049865 A1* | 2/2014 | Dougal | H02H 3/06 |
| | | | 361/71 |
| 2014/0148960 A1 | 5/2014 | Bhageria et al. | |
| 2015/0039145 A1 | 2/2015 | Yang et al. | |
| 2015/0084339 A1 | 3/2015 | McDaniel et al. | |
| 2017/0353035 A1* | 12/2017 | Guerrero | F01D 15/10 |

OTHER PUBLICATIONS

The International Bureau of WIPO, International Preliminary Report on Patentability for International Application No. PCT/US17/14671 dated Aug. 9, 2018.

* cited by examiner

ENERGIZATION CONTROL FOR ESTABLISHING MICROGRIDS

CROSS-REFERENCE TO RELATED APPLICATIONS

This application claims the benefit of U.S. Provisional Application No. 62/286,667 filed on Jan. 25, 2016. The disclosure of the above application is incorporated herein by reference.

TECHNICAL FIELD

This disclosure generally relates to energization schemes for electrical microgrids, and more particularly relates to methods and systems for energization for establishing microgrids.

BACKGROUND

Initial energization of reactive loads in electrical distribution systems typically involves large and potentially damaging transient inrush currents. For example, the magnetizing inrush current of a medium-voltage transformer may be ten times the nominal current rating of the transformer, which stresses current-carrying and protective components in the path of the transformer during energization. Other reactive devices, such as capacitor banks and harmonic filters, may have inrush characteristics similar to those of large transformers. Capacitor banks may also have high rates of change in current, or di/dt, which tends to de-stabilize the electrical distribution system through system resonances and circulating currents. These challengingly large reactive energization currents and di/dt phenomena must be considered during the design of an electrical distribution system, and appropriate mitigation components installed (such as line impedance components), where the source is usually a "stiff" utility that is abruptly connected to reactive loads (e.g., the aforementioned transformers and capacitors) through an on/off switching device such as a circuit breaker or static switch.

Managing the energization and inrush currents associated with reactive components is similarly challenging—and similarly requires coordination of system elements—during the establishment of a microgrid island when the normal utility source is unavailable or is not preferred. Such establishment in the absence of the normal utility source is sometimes referred to as Black-Start. The microgrid island itself may serve a spectrum of use-cases, from full islanding (Uninterruptible Power Supply (UPS)-type functionality for an entire electrical network over an extended period of time, involving a diversity of possible co-generation) to partial islanding (UPS-type functionality also for an extended period of time, but energizing only selected segments of the electrical network, and which may also involve a diversity of possible co-generation). The co-generation elements typically include grid-connected inverter systems with energy storage capability such as Storage Management Systems (SMS) and UPS systems, as well as diesel generators, wind turbines, and photovoltaics.

These use-cases often involve other performance criteria, such as ensuring the isolation of segments of the network for safety purposes, especially preventing backfeed of the utility. Another criterion is minimizing the use of diesel or other fossil fuel generators, typically for environmental reasons or fuel-cost reasons. Another criterion is balancing and optimizing the co-generation available on the microgrid with the loading on the microgrid. Yet another criterion is improving network power reliability, especially by reducing system average interruption duration index (SAIDI) metrics during grid contingencies. Yet another criterion is ensuring that system elements, whose safety and protection systems rely on availability of source power, have power available after the normal network source becomes unavailable, at least sufficient to get these system elements into a safe shutdown condition. In the case of a wind turbine, for example, the blade pitch controls may rely on source power to feather the blades into a safe rotational position, to reduce stresses on the tower. In the case of a substation control building, as another example, heating or air conditioning may be necessary to keep the interior of the control building within the temperature rating of the control systems within the building. Two more criteria are energizing system elements without overstressing other system elements or de-stabilizing the microgrid network, and sustaining the microgrid for an extended period of time, even indefinitely. While conventional systems and methods of energizing microgrids are suitable for their original intended purposes, the need to improve microgrids and microgrid energization methods continues to increase.

Accordingly, it is desirable to provide microgrid energy distribution systems and methods for energizing microgrids. Furthermore, other desirable features and characteristics of the present invention will become apparent from the subsequent detailed description and the appended claims, taken in conjunction with the accompanying drawings and the foregoing technical field and background.

DESCRIPTION OF THE DRAWINGS

The disclosure, both as to its organization and method of operation, together with further advantages thereof, will best be understood by reference to the specification taken in conjunction with the accompanying drawing in which.

DETAILED DESCRIPTION

Figure 1:
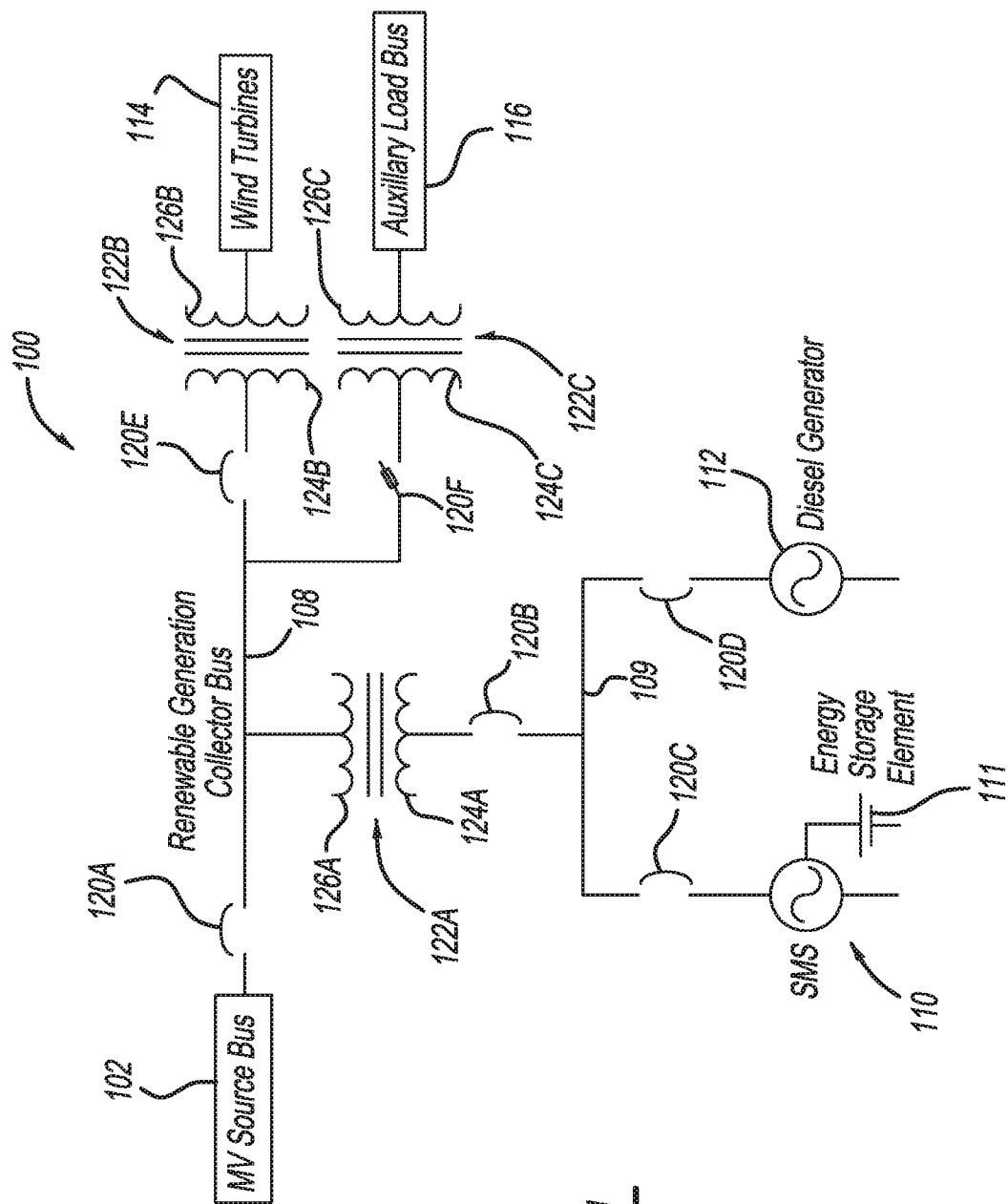
FIG. 1 is a simplified schematic of a microgrid in accordance with teachings of the present disclosure.

Methods for energizing microgrids and microgrid components are provided. In one embodiment, a method for energizing a microgrid includes energizing a storage management system (SMS) that is configured to control power distribution in the microgrid. The method further includes connecting a plurality of reactive components to the SMS based on a configuration indicated by the SMS. One method yet further includes ramping up an output voltage of the SMS based on limiting inrush currents of the plurality of reactive components in the microgrid. Some embodiments of control methods include stepping the SMS output and pulsing the SMS output in a manner which limits the inrush currents of reactive components in the microgrid.

In another embodiment, a microgrid energy distribution system includes a plurality of reactive components, a storage management system (SMS), and a generator configured for energizing the SMS. The SMS is selectively coupled to the plurality of reactive components and is configured to control power distribution through the microgrid energy distribution system. The SMS is further configured for connecting the plurality of reactive components to the microgrid energy distribution system based on a configuration control programmed into the SMS. The SMS is yet further configured for ramping up an output voltage of the SMS based on limiting inrush currents of the plurality of reactive components in the microgrid energy distribution system.

In another embodiment, a method for energizing a microgrid includes opening a plurality of switches of the microgrid and starting a generator. The method further includes energizing, with the generator, a storage management system (SMS) that is configured to control power distribution in the microgrid. The method yet further includes synchronizing the SMS with the generator, either turning off the generator or paralleling the SMS output with the generator, and connecting a plurality of reactive components to the SMS based on a configuration indicated by the SMS. The method yet further includes ramping up an output voltage of the SMS based on limiting inrush currents of the plurality of reactive components in the microgrid.

Example embodiments will now be described more fully with reference to the accompanying drawings. There is no intention to be bound by any principle presented in the preceding background or the following detailed description.

In general, the disclosure relates to microgrids and energization control methods for establishing microgrids using Energy Storage Systems (ESS) such as one or more or any combination of a Storage Management System (SMS), Community Energy Storage System (CES), or Uninterruptible Power Supply (UPS), or one or more controller such as a Programmable Logic Controller (PLC), Embedded Control System, Microgrid Controller, Microgrid Control and Management System, Distribution Control and Management System, or Grid Control and Management System. The energization control methods and controllers provide Black-Start capability, intelligent coordination and energization of network elements, island formation and control, and utility grid restoration. The methods and controllers may be utilized in response to loss of power from a utility power grid or when other circumstances require energization of a microgrid. The microgrids and energization control methods ramp up a voltage output of the SMS to energize the transformers and any other reactive elements in the network, such as capacitor banks, while limiting the burden on the SMS from inrush currents associated with energization of such reactive elements.

In some examples, diesel generators are started first for a limited time to provide a non-utility formed microgrid in which the SMS participates. The generators are not required to be capable of handling the inrush from the transformers on the network segments. After the diesel generators are started and are providing terminal voltage to the SMS, the SMS system makes the decisions about switching-in network segments based on either pre-configured settings or real-time input from an operator. The SMS then handles the inrush associated with reactive devices on the switched-in networks. The SMS interfaces with wind power or other renewable sources available as co-generation on the microgrid. The SMS then takes control of the power-balancing of the microgrid and the diesel generators are turned off.

FIG. 1 is a simplified one-line diagram illustrating an embodiment of a microgrid 100 selectively coupled with a utility grid medium voltage source bus 102 in accordance with the teachings of the present disclosure. As used herein, a "microgrid" is defined as a localized grouping of distributed electricity sources, loads, and storage mechanisms which can operate both as part of the central grid or independently as an island. An "island" or an "islanded microgrid" is a microgrid whose electric loads are electrically separated from the central utility grid, and whose loads run solely off of a local distributed generation source instead of a bulk power utility source. It should be appreciated that the methods and microgrids described herein may be applied to four-quadrant power conversion systems with any AC and DC ratings, to permanent microgrid installations (e.g., for business campuses, educational campuses, military bases, etc.), to temporary energy storage installations (e.g., for grid reinforcement during contingencies), to intelligent automated grid restoration schemes, to emergency power restoration of isolated grids, and to other networks and methods.

Medium voltage source bus 102 is a feeder line from a bulk utility power grid. In some embodiments, medium voltage source bus 102 may be other types of bulk utility power grid components or may be omitted for solely islanded microgrids.

In the example provided, microgrid 100 includes a collector bus 108, an SMS bus 109, a Storage Management System (SMS) 110, an energy storage element 111, a diesel generator 112, wind turbines 114, an auxiliary load bus 116, first through sixth switches 120A-F, and first through third transformers 122A-C. Collector bus 108 is illustrated as a renewable energy generation collector bus formed from electrical current carrying components, such as power cables.

SMS 110 is a control system that can charge or discharge energy storage element 111, hold feeder voltage, and provide other storage management functions in microgrid 100. In the example provided, SMS 110 is a PUREWAVE® Storage Management System available from S&C Electric Company of Chicago, Ill. Energy storage element 111 may be any energy storage system capable of charging from medium voltage source bus 102, storing energy, and discharging energy to collector bus 108. In the example provided, energy storage element 111 is a PUREWAVE® UPS-XT model energy storage element available from S&C Electric Company of Chicago, Ill.

Diesel generator 112 burns diesel fuel to generate electricity and wind turbines 114 are cogeneration electrical sources that generate electricity when wind rotates blades of wind turbines 114. It should be appreciated that wind turbines 114 are merely an example of a suitable renewables generator, which may also be realized as photovoltaics or other renewable sources. Auxiliary load bus 116 is an electrical load. In the example provided, auxiliary load bus 116 is coupled with electric motors or other devices that feather the blades of wind turbines 114 to place the blades in a position in which harmful stresses on wind turbines 114 are minimized.

SMS 110 and diesel generator 112 may include any control circuitry capable of performing the various tasks described below with reference to FIG. 2. For example, SMS 110 an/or diesel generator 112 may include an application specific integrated circuit (ASIC), an electronic circuit, a processor (shared, dedicated, or group) and memory that execute one or more software or firmware programs, a combinational logic circuit, and/or other suitable components that provide the described functionality. In some embodiments, the network devices may include hardware-based logic, or may include a combination of hardware, firmware, and/or software elements. In some embodiments, the control logic is software or firmware programmed to perform operations of the algorithm described below with reference to FIG. 2.

Transformers 122A-C have first sides 124A-C and second sides 126A-C. As will be appreciated by those with ordinary skill in the art, transformers 122A-C increase or decrease the electrical voltage of electricity transferred between first sides 124A-C and second sides 126A-C.

Switches 120A-F selectively couple various components of microgrid 100 with each other. Switches 120A-F may be automatically controlled by SMS 110 or may be manually controlled by technicians. In an open position, switches 120A-F prevent a flow of electricity. Conversely, in a closed position, switches 120A-F permit electricity to flow through switches 120A-F. First switch 120A selectively couples medium voltage source bus 102 with collector bus 108. Second switch 120B selectively couples first side 124A of first transformer 122A with SMS bus 109. Third switch 120C selectively couples SMS bus 109 with SMS 110. Fourth switch 120D selectively couples SMS bus 109 with diesel generator 112. Fifth switch 120E selectively couples collector bus 108 with second side 124B of second transformer 122B. Sixth switch 120F selectively couples collector bus 108 with second side 124C of third transformer 122C.

Figure 2:
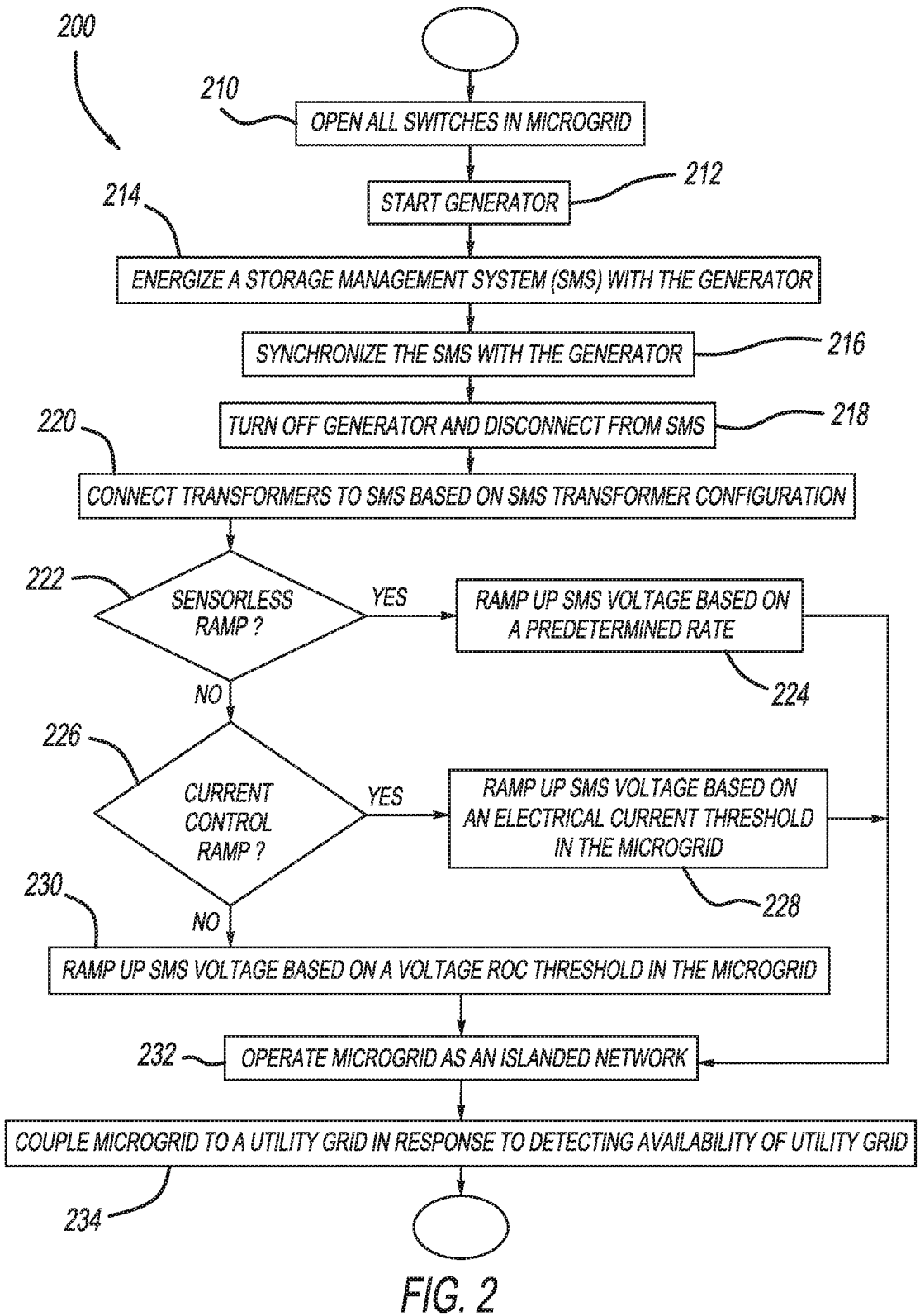
FIG. 2 is a simplified flow diagram of a method for energizing the microgrid of FIG. 1 in accordance with teachings of the present disclosure.

FIG. 2 illustrates an embodiment of a method 200 for energizing a microgrid energy distribution system in accordance with some embodiments. For example, SMS 110 and diesel generator 112 of microgrid 100 may perform various operations of method 200. In the example provided, method 200 is performed in response to a loss of utility grid medium voltage source bus 102 during a power outage. Operation 210 opens all switches in the microgrid to put the microgrid in a known state. In the example provided, SMS 110 opens switches 120A-F prior to starting diesel generator 112.

Operation 212 starts a generator of the microgrid. For example, diesel generator 112 may be started in a manual or semi-automated fashion, with or without keyed switches or interlocks as will be appreciated by those with ordinary skill in the art. In some embodiments operation 212 is omitted when SMS 110 is already operational.

Operation 214 energizes a storage management system (SMS) that is configured to control power distribution in the microgrid. For example, diesel generator 112 may energize SMS 110 by closing third and fourth switches 120C-D after diesel generator 112 has stabilized to electrically couple diesel generator 112 to SMS 110. In the example provided, diesel generator 112 sends a continuous Black Start indication signal to SMS 110 in the form of a contact closure. In some embodiments, the Black Start indication signal is also or alternatively sent to the SMS from the utility grid provider, and/or by a System Operator, and/or by local or remote discrete control signal. The Black Start indication signal indicates to the SMS that method 200 is being performed.

At this point in the Black Start sequence, SMS 110 precharges an internal DC Link and a DC Bus in order to close SMS internal AC and DC breakers. The SMS then makes various logical decisions based on: detection of whether bus voltage is present from a diesel generator and/or other generation source; detection of the Black Start signal from the Diesel Generator or Utility or System Operator; the condition of Energy Storage Element 111 (e.g., whether to allow diesel generator 112 to charge the energy storage element 111 through SMS 110 to a minimum capacity level); the condition of the switches (e.g., to ensure that subsequent actions are performed in a safe and controlled fashion); and, the presence of any diagnostic alarms and warnings. In the example provided, energy storage element 111 has a reasonable stored capacity and is electrically connected to SMS 110, the switches are in expected conditions, and no alarms are active. In other embodiments, additional and/or alternative operations may be utilized based on the specific conditions encountered upon performance of method 200.

Operation 216 synchronizes phases of the SMS and the generator. For example, SMS 110 may synchronize itself with diesel generator 112 in a Current Source mode in order to recharge energy storage element 111 if necessary.

Operation 218 turns off the generator and disconnects the generator from the SMS. For example, SMS 110 may send a control signal commanding diesel generator 112 to turn off and may open fourth switch 120D to disconnect diesel generator 112 from SMS bus 109. In some embodiments, operation 218 is omitted or delayed to operate the generator in parallel with the SMS.

Operations 212, 214, 216, and 218 represent one implementation for an initial energization sequence when a diesel generator or other generation source is present. Other energization sequences include energizing the SMS from its own battery system, both with and without a diesel generator or other generation source present. Those of ordinary skill in the art will recognize that a diesel generator and/or other generation source are not required in all embodiments.

Operation 220 connects a plurality of reactive components to the SMS based on a configuration indicated by the SMS. For example, SMS 110 may determine which of transformers 122A-C are to be energized by retrieving configuration information stored in the SMS controls. In the example provided, transformers 122A-C are configured to be energized by closure of switches 120B, 120E, and 120F.

Method 200 proceeds to ramp up an output voltage of the SMS based on limiting inrush currents of the reactive components in the microgrid. The ramping energizes the islanded microgrid "softly" according to a voltage ramping scheme. In the example provided, a sensorless, a current-control, and a voltage control scheme are described. Which ramping scheme is utilized in any given implementation may be programmed into controls of SMS 110, may be selected prior to or during performance of method 200, or may be selected using other suitable methods. As used herein, the term "ramping" includes any method of gradually increasing an average voltage output (e.g., stepping the SMS output, pulsing the SMS output, steadily increasing the SMS output, etc.) in a manner which limits the inrush currents of reactive components in the microgrid. It should be appreciated that various combinations of voltage-control, current-control, and frequency-control schemes may be utilized in alternative embodiments.

In general, the ramping controls currents and di/dt in the microgrid network by adjusting the ramp rate of the SMS output voltage during the initial energization of the reactive components. For example, SMS 110 may ramp up voltage to a nominal voltage in a voltage source mode from zero or a small non-zero value that limits the required energization current to within acceptable levels. In the example provided, SMS 110 begins the ramping scheme in response to detecting closure of switches 120B, 120E, and 120F.

Operation 222 determines whether the ramping scheme is a sensorless ramp. When the ramping scheme is a sensorless ramp, method 200 proceeds to operation 224 where SMS 110 ramps up output voltage based on a predetermined rate. The predetermined rate is based on predicted electrical parameters of the reactive components according to the configuration of the SMS. For example, the predetermined ramp rate may be based on the known electrical parameters (e.g., inrush currents) associated with transformers 122A-C and other reactive components of microgrid 100.

When the ramping scheme is not a sensorless ramp, method 200 proceeds to operation 226. Operation 226 determines whether the ramping scheme is a current control ramp. When the ramping scheme is a current control ramp, method 200 proceeds to operation 228 where SMS 110 ramps up output voltage based on limiting a measured current in the microgrid to less than an electrical current threshold. The measured current may be measured at the output of SMS 110 or at any other node of microgrid 100 and fed back into controls of SMS 110 to adjust the ramp rate of output voltage from SMS 110. The electrical current threshold may be fixed, may be variable, and may be software-configurable.

When the ramping scheme is not a current control ramp, method 200 proceeds to operation 230 where SMS 110 ramps up output voltage based on limiting a rate of change of node voltage at a node in the microgrid. The voltage rate of change threshold may be software-configurable and may be either fixed or variable. The voltage rate of change may be measured or sensed at the SMS output, sensed at selected nodes within the network, and/or calculated for other nodes within the network. The sensed or calculated voltage is then fed-back into the SMS voltage regulation controls to adjust the ramp rate on the SMS output voltage.

After ramping up voltage in one of operations 224, 228, or 230, method 200 proceeds to operation 232 to operate the microgrid as an islanded network. For example, SMS 110 may operate microgrid 100 to re-start and re-connect with the diesel generator, to re-start and re-connect with the wind turbines, to control the wind turbines to support the auxiliary load bus, to re-charge the energy storage element through the SMS, and to provide power-smoothing and voltage regulation. Other suitable operations include implement droop controls for co-generators in the network, controlling capacitor banks and reactor banks, for power factor correction or voltage regulation, performing demand-response functions, either initiating load-shedding or energizing additional loads. Still further operations include implementing flux-balancing algorithms for subsequent energization of transformers in the network, or shutting down the SMS with the system components in a pre-determined state.

Operation 234 couples the microgrid to a utility grid in response to detecting availability of the utility grid. For example, when SMS 110 detects energization and stabilization of medium voltage source bus 102, SMS 110 synchronizes microgrid 100 with medium voltage source bus 102 using suitable control and feedback signaling to/from controllable devices in the network. The SMS then closes switch first switch 120A and performs a soft transfer of the microgrid to the utility grid using conventional SMS control schemes. In some embodiments, microgrid 100 may remain islanded and not re-connect to the grid, depending on the availability of co-generators in the microgrid.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

We claim:

1. A method for energizing a microgrid, the method comprising:
   energizing a storage management system (SMS) that is configured to control power distribution in the microgrid;
   connecting a plurality of reactive components to the SMS based on a configuration control programmed into the SMS; and
   ramping up an output voltage of the SMS based on limiting inrush currents of the plurality of reactive components in the microgrid, and wherein
   energizing the SMS includes:
   starting a generator;
   electrically coupling the generator to the SMS;
   synchronizing the SMS with the generator; and
   disconnecting the generator from the SMS.

2. The method of claim 1, wherein energizing the SMS is performed in response to a loss of a utility grid medium voltage source bus.

3. The method of claim 1, wherein energizing the SMS further includes recharging an energy storage element coupled with the SMS prior to disconnecting the generator from the SMS.

4. The method of claim 1, further comprising opening each of a plurality of switches prior to starting the generator, wherein electrically coupling the generator to the SMS includes closing at least one of the plurality of switches and connecting the plurality of reactive components to the SMS includes closing at least one other of the plurality of switches.

5. The method of claim 1, wherein ramping up the output voltage uses a predetermined ramp rate based on predicted electrical parameters of the plurality of reactive components according to the configuration indicated by the SMS.

6. The method of claim 1, wherein ramping up the output voltage is based on limiting a measured current in the microgrid.

7. The method of claim 1, wherein ramping up the output voltage is based on limiting a rate of change of node voltage at a node in the microgrid.

8. The method of claim 1, further comprising restoring the microgrid to a utility grid medium voltage bus source in response to detecting availability of the utility grid medium voltage bus source.

9. A microgrid energy distribution system comprising:
   a plurality of reactive components;
   a storage management system (SMS) selectively coupled to the plurality of reactive components and configured to control power distribution through the microgrid energy distribution system, the SMS further configured for:
   connecting the plurality of reactive components to the microgrid energy distribution system based on a configuration control programmed into the SMS; and
   ramping up an output voltage of the SMS based on limiting inrush currents of the plurality of reactive components in the microgrid energy distribution system; and
   a generator configured for energizing the SMS, the generator being configured to energize and synchronize with the SMS upon starting of the generator and to disconnect from the SMS once synchronization with the SMS is achieved.

10. The microgrid energy distribution system of claim 9, further comprising a first switch disposed between the microgrid energy distribution system and a medium voltage source bus of a utility power grid.

11. The microgrid energy distribution system of claim 10, further comprising loads and renewable-energy generators selectively coupled to the SMS.

12. The microgrid energy distribution system of claim 11, further comprising a collector bus, an SMS bus, a second switch disposed between the collector bus and the SMS bus, a third switch disposed between the SMS bus and the SMS, and a fourth switch disposed between the generator and the SMS bus.

13. The microgrid energy distribution system of claim 12, wherein the plurality of reactive components include a first transformer disposed between the second switch and the collector bus, a second transformer disposed between the renewables generator and the collector bus, and a third transformer disposed between the load and the collector bus.

14. The microgrid energy distribution system of claim 9, wherein the SMS is configured for ramping up the output voltage using a predetermined ramp rate based on predicted electrical parameters of the plurality of reactive components according to the configuration control programmed into the SMS.

15. The microgrid energy distribution system of claim 9, wherein the SMS is configured for ramping up the output voltage based on limiting a measured current in the microgrid energy distribution system.

16. The microgrid energy distribution system of claim 9, wherein the SMS is configured for ramping up the output voltage based on limiting a rate of change of node voltage at a node in the microgrid energy distribution system.

17. A method for energizing a microgrid, the method comprising:
 opening a plurality of switches of the microgrid;
 starting a generator;
 energizing, with the generator, a storage management system (SMS) that is configured to control power distribution in the microgrid;
 synchronizing the SMS with the generator;
 disconnecting the generator from the SMS once synchronization is achieved;
  connecting a plurality of reactive components to the SMS based on a configuration indicated by the SMS; and
  ramping up an output voltage of the SMS based on limiting inrush currents of the plurality of reactive components in the microgrid.

18. The method of claim 17, further comprising sending a Black Start indication signal from the generator to the SMS prior to energizing the SMS.

19. The method of claim 17, wherein ramping up the output voltage of the SMS further includes ramping up the output voltage from about zero volts to a nominal voltage.

* * * * *